United States Patent
Chen

(10) Patent No.: US 9,160,250 B2
(45) Date of Patent: Oct. 13, 2015

(54) CONTROL CIRCUIT OF POWER SUPPLY SYSTEM

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 223 days.

(21) Appl. No.: 13/861,707

(22) Filed: Apr. 12, 2013

(65) Prior Publication Data

US 2013/0294125 A1    Nov. 7, 2013

(30) Foreign Application Priority Data

May 7, 2012    (JP) .................................. 2012-105884

(51) Int. Cl.
*G05F 1/613* (2006.01)
*H02M 7/217* (2006.01)
*H02M 1/42* (2007.01)

(52) U.S. Cl.
CPC ............ *H02M 7/217* (2013.01); *H02M 1/4225* (2013.01); *Y02B 70/126* (2013.01)

(58) Field of Classification Search
CPC ....... H02M 1/36; H02M 1/32; H02M 1/4225; H02M 3/156; Y02B 70/126
USPC .................. 323/222, 266, 282–288, 299, 318; 330/253–258, 260, 311
See application file for complete search history.

(56) References Cited

U.S. PATENT DOCUMENTS

| 5,019,952 | A | * | 5/1991 | Smolenski et al. | ............. | 363/16 |
| 5,349,281 | A | * | 9/1994 | Bugaj | ............. | 320/160 |
| 5,359,276 | A | * | 10/1994 | Mammano | ............. | 323/207 |
| 5,614,810 | A | * | 3/1997 | Nostwick et al. | ............. | 323/207 |
| 7,095,215 | B2 | * | 8/2006 | Liu et al. | ............. | 323/222 |
| 2009/0303751 | A1 | * | 12/2009 | Usui | ............. | 363/15 |

FOREIGN PATENT DOCUMENTS

JP    2011-211828 A    10/2011

* cited by examiner

*Primary Examiner* — Rajnikant Patel
(74) *Attorney, Agent, or Firm* — Rossi, Kimms & McDowell LLP

(57) ABSTRACT

Aspects of the invention provide an error amplifier that can compare a feedback voltage of an output voltage with a reference voltage to produce a resulting error signal in cooperation with a phase compensating circuit. In some aspects of the invention, an AC detecting circuit makes a decision as to whether a detected input voltage signal is that of a 100 Vac system or that of a 200 Vac system to change the gain of the error amplifier according to the result of the decision. When the voltage signal Vis is lower than the threshold voltage established beforehand, for making the transient response speed of the phase compensating circuit faster, the AC detecting circuit increases the gain of the error amplifier. When the voltage signal is higher than the threshold voltage established beforehand, for making a power factor higher, the AC detecting circuit decreases the gain of the error amplifier.

7 Claims, 7 Drawing Sheets

CONTROL CIRCUIT OF POWER SUPPLY SYSTEM

BACKGROUND OF THE INVENTION

1. Field of the Invention

Embodiments of the invention relate to control circuits and improved power factor power supply systems.

2. Related Art

A switching converter (switching power supply system) having an output of an AC (Alternating Current) power supply as an input makes switching devices connecting the input and the output carry out switching operations to thereby invert a full wave rectified AC input voltage to a DC output voltage at a desired level to supply the DC output voltage to a load. Such a switching converter is widely used in devices such as electronic devices.

In such a switching converter, for ensuring stabilization and safety of a commercial electric power system, a power factor improvement is required for switching converters with power consumption thereof exceeding 75 W, for example. By the power factor improvement, loads on facilities in distribution systems are reduced to permit reduction in electric power costs.

In an improved power factor switching converter, when a load is inductive, the phase of an input current delays to the phase of an input voltage. Thus, by carrying out an adjustment for making the input current become in phase with the input voltage, the power factor is made enhanced. The converter is also provided with an error amplifier comparing an output voltage with a reference voltage and a phase compensation circuit for compensating the phase of an error signal as a result of the comparison in the error amplifier.

For obtaining a high power factor, the value of the gain of the error amplifier and the value of the phase compensation constant (time constant) of the phase compensation circuit are to be established to adequate values. This, however, caused a slow transient response when an input voltage became particularly low in a circuit with the phase compensation circuit being additionally provided to sometimes lower the response of the circuit.

For improving the delay in the transient response, a technique is proposed with which an output voltage is detected and, when the overshoot or undershoot in the detected voltage accompanied with the transient response becomes large, the gain of an error amplifier is made promptly increased. See Japanese Patent Application No. P-A-2011-211828 (also referred to herein as "Patent Document 1").

With such technique as is proposed in Japanese Patent Application No. JP-A-2011-211828, however, when the input voltage is high, the power supply gain also becomes high. Hence, there was a problem in that the further prompt increase in the gain in the error amplifier with the input voltage being high might cause the oscillation in the output voltage. Moreover, when the input voltage is low, there was also a problem with respect to the undershoot of the output voltage in that an adequate value of a phase compensation constant was difficult to be established to make the circuit design difficult.

Thus, as described above, certain shortcomings exist in the related art.

SUMMARY OF THE INVENTION

Embodiments of the invention are directed to these and other shortcomings. Some embodiments provide a control circuit of a power supply system actualizing both a power factor improvement and a reduction in the delay in transient response. In some embodiments, a control circuit of a power supply system is provided which converts a rectified AC input voltage to a DC output voltage. The control circuit of a power supply system can be provided with an error signal producing unit, a phase compensating unit and an input voltage detecting unit. The error signal producing unit can detect the DC output voltage and outputs a signal into which the difference voltage between the detected DC output voltage and a reference voltage is amplified. The phase compensating unit can produce an error signal in cooperation with the error signal producing unit. The input voltage detecting unit can detect the AC input voltage and outputs a control signal with the level thereof corresponding to the magnitude of the detected AC input voltage to change the gain in the error signal producing unit by the outputted control signal.

In some embodiments, with the control circuit, actualization of both a power factor improvement and a reduction in the delay in transient response is made possible.

DETAILED DESCRIPTION

Figure 1:
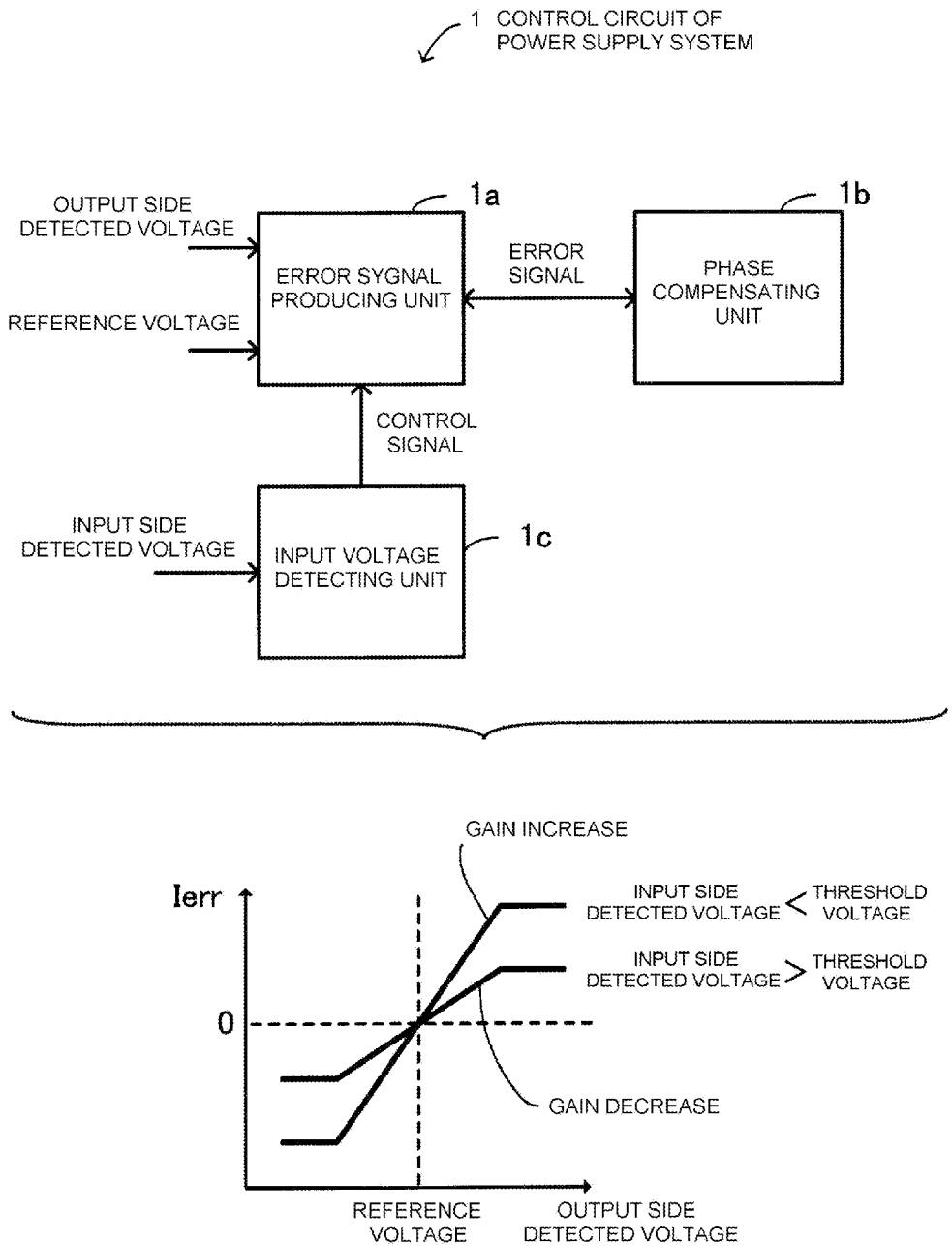
FIG. 1 is a block diagram showing an example of a configuration of the principal part of a control circuit of a power supply system according to embodiments of the invention.

In the following, embodiments of the invention are explained with reference to the attached drawings. FIG. 1 is a block diagram showing an example of a configuration of the principal part of a control circuit of a power supply system according to the invention. The power supply system is a system converting a rectified AC input voltage to a DC output voltage and the control circuit of the power supply system 1 is provided with an error signal producing unit 1a, a phase compensating unit 1b and an input voltage detecting unit 1c.

The error signal producing unit 1a, for producing an error signal, outputs a signal into which the difference between an output side detected voltage, detected from an output voltage, and a reference voltage is amplified. The phase compensating unit 1b carries out phase compensation with the frequency characteristic of the error signal producing unit 1a taken into consideration, by which the error signal is produced in cooperation with the error signal producing unit 1a.

The input voltage detecting unit 1c, on the basis of the result of the comparison between an input side detected voltage representing an AC input voltage and a threshold voltage established beforehand, makes a decision as to whether the input side detected voltage is a voltage in a high voltage system or a voltage in a low voltage system to change the gain of the error signal producing unit 1a.

In this case, the input voltage detecting unit 1c increases the gain in the error signal producing unit 1a when the input side detected voltage is always lower than the threshold voltage during a half period of the AC input voltage to be decided that the input side detected voltage is that of a low voltage system (100 Vac system, for example). Moreover, when the input side detected voltage is sometimes higher than the threshold voltage during the half period of the AC input voltage to be decided that the input side detected voltage is that of a high voltage system (200 Vac system, for example), the input voltage detecting unit 1c decreases the gain in the error signal producing unit 1a.

Here, the graph presented in FIG. 1 shows relations between the output side detected voltage (the detected value of the output voltage of the power supply system) and a current signal (error current signal) Ierr as a direct output of the error signal producing unit 1a. In the graph, the horizontal axis represents the output side detected voltage and the vertical axis represents the current signal (error current signal) Ierr.

In the input voltage detecting unit 1c, when the input side detected voltage is decided to be the voltage of the low voltage system, the gain of the error signal producing unit 1a is increased to increase a current value of the current signal (error current signal) Ierr outputted from the error signal producing unit 1a. Moreover, when the input side detected voltage is decided to be the voltage of the high voltage system, the gain of the error signal producing unit 1a is decreased to decrease a current value of the current signal (error current signal) Ierr outputted from the error signal producing unit 1a.

Figure 2:
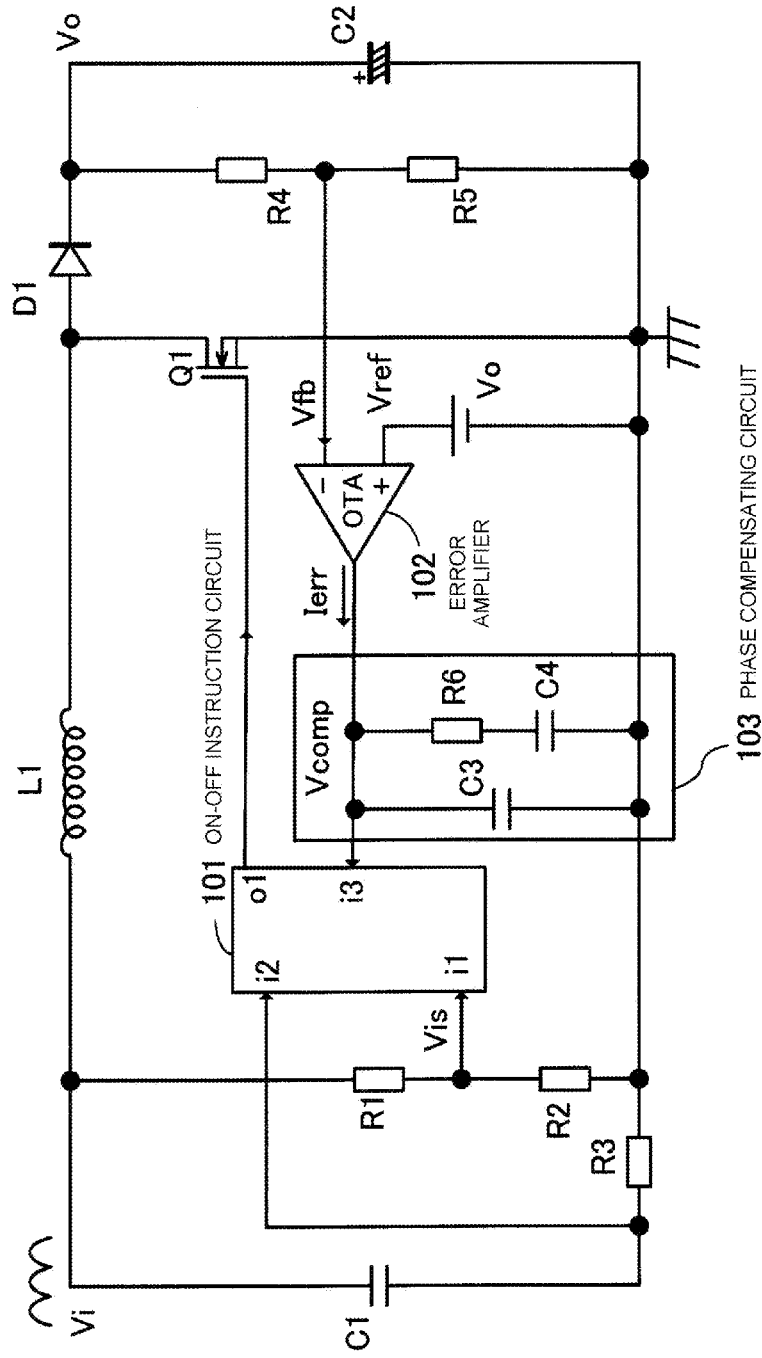
FIG. 2 is a circuit diagram showing an example of the circuit configuration of a related step-up improved power factor switching power supply system.

Next, before explaining the detail of the control circuit of the power supply system 1, problems to be solved by the invention will be explained in detail. FIG. 2 is a circuit diagram showing an example of the circuit configuration of a related step-up improved power factor switching power supply system.

The step-up improved power factor switching power supply system 100 is provided with an input capacitor C1, a step-up inductor L1, a switching device (N-channel MOSFET (Metal Oxide Semiconductor Field Effect Transistor)) Q1, a rectifying diode D1, an output capacitor C2, input voltage detecting resistors R1 and R2, an operating current detecting resistor R3, an on-off instruction circuit 101, output voltage detecting resistors R4 and R5, a reference power supply unit Vr, an error amplifier (OTA: Operational Transconductance Amplifier) 102 as a voltage to current converting amplifier circuit and a phase compensating circuit 103. The phase compensating circuit 103 includes capacitors C3 and C4 and a resistor R6.

First, explanations will be made with respect to connections of constituents. One end of the input capacitor C1 is connected to one end of the resistor R1 and one end of the inductor L1. The other end of the input capacitor C1 is connected to the input terminal i2 of the on-off instruction circuit 101 and one end of the resistor R3.

The other end of the resistor R1 is connected to one end of the resistor R2 and the input terminal i1 of the on-off instruction circuit 101. The other end of the inductor L1 is connected to the drain of the switching device Q1 and the anode of the diode D1. The gate of the switching device Q1 is connected to the output terminal o1 of the on-off instruction circuit 101.

The cathode of the rectifying diode D1 is connected to one end of the resistor R4 and the positive polarity side terminal of the capacitor C2. The other end of the resistor R4 is connected to one end of the resistor R5 and the inverting input terminal (−) of the error amplifier 102. The non-inverting input terminal (+) of the error amplifier 102 is connected to one end of the reference power supply unit Vo.

The output terminal of the error amplifier 102 is connected to one end of the resistor R6, one end of the capacitor C3 and the input terminal i3 of the on-off instruction circuit 101. The other end of the resistor R6 is connected to one end of the capacitor C4.

The other end of the capacitor C3 is connected to the other end of the resistor R2, the other end of the resistor R3, the other end of the capacitor C4, the other end (GND) of the reference power supply unit Vr, the source of the switching device Q1, a ground GND, the other end of the resistor R5 and the negative polarity side terminal of the capacitor C2.

In the next, the operation of the circuit will be explained. An input voltage Vi obtained by the full-wave rectification of an AC input voltage on the rectifier (not shown) side is divided by the input voltage detecting resistors R1 and R2. A voltage signal Vis obtained by the voltage division is transmitted to the input terminal i1 of the on-off instruction circuit 101.

The on-off instruction circuit 101 outputs an H (high) level signal from the output terminal o1 to turn-on the switching device Q1 with a decision that the current flowing in the inductor L1 has become zero which decision is made by an inductor current detecting signal (a voltage signal into which an inductor current flowing in the resistor R3 is converted by the resistor R3) inputted to the input terminal i2, or with triggering by an internal oscillation circuit. The turning-on of the switching device Q1 makes a current flow through the step-up inductor L1. At this time, energy is stored in the step-up inductor L1.

An output voltage Vo is divided by the output voltage detecting resistors R4 and R5 and a divided voltage (FB (feedback) voltage) Vfb is inputted to the error amplifier 102 having a V/I (voltage to current) converting function. The error amplifier 102 compares the FB voltage Vfb with a reference power supply voltage Vref to output a current signal (error current signal) Ierr on the basis of the result of the comparison. The current signal Ierr is any one of current signals for two cases, the case of being the error current signal of the source current for the phase compensating circuit 103 and the case of being the error current signal of the sink current for the phase compensating circuit 103.

By the phase compensating circuit 103 including the capacitors C3 and C4 and the resistor R6, the current signal Ierr outputted from the error amplifier 102 is converted to an error signal Vcomp as a voltage signal (the current signal Ierr is separated to flow in the series circuit of the resistor R6 and the capacitor C4 and flow in the capacitor C3 and the separated currents generate a voltage across the resistor R6 and the capacitor C4 and a voltage across the capacitor C3). The error signal Vcomp is transmitted to the input terminal i3 of the on-off instruction circuit 101. The on-off instruction circuit 101 carries out a multiplication of the error signal Vcomp and the voltage signal Vis as the voltage at the connection point of the resistors R1 and R2. The value of the result of the multiplication is taken as the target value of an inductor current detecting signal of the switching device Q1.

The on-off instruction circuit 101, when the value of the inductor current detecting signal reaches the target value, outputs an L (low) level signal to turn-off the switching device Q1. The turning-off of the switching device Q1 makes a voltage due to the energy stored in the step-up inductor L1 added to the input voltage Vi to be outputted to the outside through the rectifying diode D1 and the output capacitor C2.

At this time, the completion of the release of the energy stored in the step-up inductor L1 or the triggering by the oscillation circuit in the on-off instruction circuit 101 turns-on the switching device Q1 again. By repeating such operations, a power factor is improved while a specified output voltage being obtained.

Subsequent to this, problems in the switching power supply system 100 and the system disclosed in JP-A-2011-211828 (hereinafter referred to as related art) will be explained. For obtaining a high power factor in the switching power supply system 100, it is necessary to adequately establish the gain of the error amplifier 102 and the capacitance values of the capacitors C3 and C4 and the resistance value of the resistor R6 in the phase compensating circuit 103.

In this case, in the phase compensating circuit 103, a cutoff frequency generally established to be equal to or less than 10 Hz caused a problem in that the transient response becomes slow to lower the response characteristic particularly in the case when the input voltage becomes low.

To such a problem, in the system of related art, a countermeasure is taken in which an output voltage is detected for promptly increase the gain of the error amplifier 102 when the overshoot or undershoot of the detected voltage becomes large. That is, in the related art, the error amplifier 102, being an OTA type of outputting a current, has a configuration with an additional current source for injecting a current and an additional current source for pulling out a current.

Figure 3:
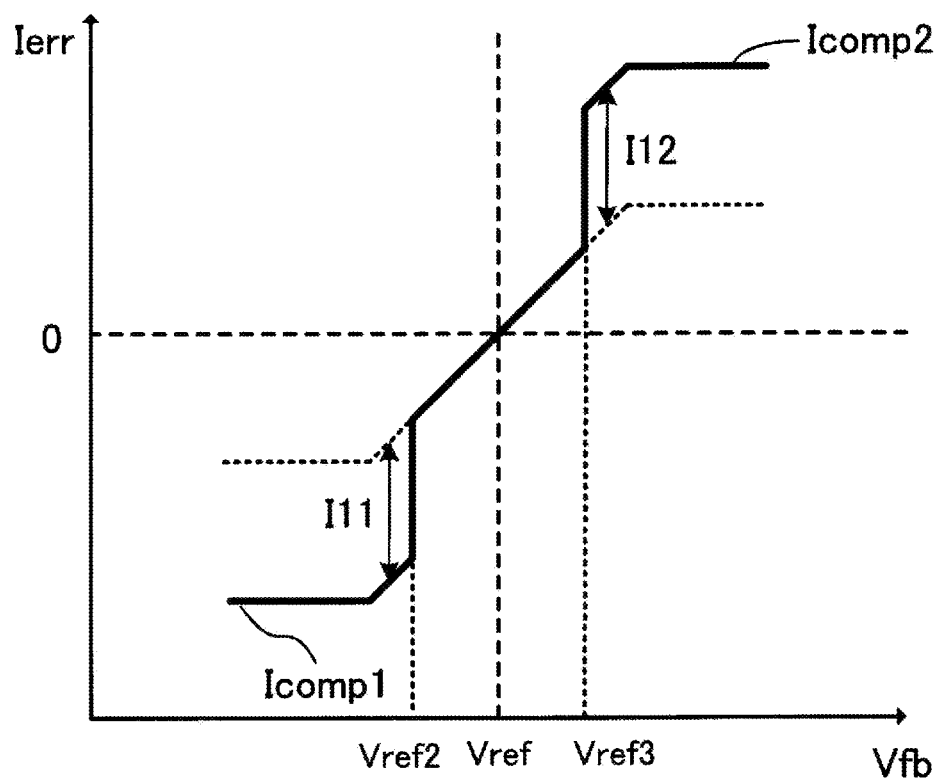
FIG. 3 is a diagram showing the relation between the FB voltage and the output current of the error amplifier in the related step-up improved power factor switching power supply system shown in FIG. 2.

FIG. 3 is a diagram showing the relation between the FB voltage Vfb and the error current signal Ierr as the output current of the error amplifier 102 in the related step-up improved power factor switching power supply system shown in FIG. 2. The horizontal axis represents the FB voltage Vfb and the vertical axis represents the error current signal Ierr. The error amplifier 102 amplifies an error voltage between the FB voltage Vfb and the reference voltage Vref to output an error current signal Ierr depending on the error voltage. Here in FIG. 3, the error current signal Ierr is treated with the direction to the sink side taken as the positive direction.

The error amplifier 102, when the FB voltage Vfb is smaller than a reference voltage Vref2, outputs a current having a constant current I11 added to a reference operational amplifier current proportional to an error voltage as a source current (Icomp1 shown in FIG. 3). Moreover, the error amplifier 102, when the FB voltage Vfb is larger than a reference voltage Vref3, outputs a current having a constant current I12 added to the reference operational amplifier current as a sink current (Icomp2 shown in FIG. 3). In this way, the error current signal Ierr varies depending on the FB voltage Vfb. The currents Icomp1 and Icomp2 saturate when the absolute value of (Vfb−Vref) becomes larger.

While, when the input voltage to the system is provided to the worldwide specifications (from 85 Vac to 264 Vac, for example), the higher the input voltage becomes, the higher a power supply gain becomes to lower the power factor. Conversely, the lower the input voltage becomes, the lower the power supply gain becomes to cause the transient response to become slow.

Here, the meaning of "the higher the input voltage becomes, the higher a power supply gain becomes" will be explained. A current i flowing in the step-up inductor L1 when the switching device Q1 is turned-on increases with respect to time t with a rate of change di/dt=Vi/L1. Hence, the current flowing in the step-up inductor L1, i.e. the input current, changes in a shorter time as the input voltage becomes larger. This is the meaning of "a voltage gain is high".

In addition, the meaning of "the higher power supply gain lowers the power factor" will be explained. It is important for a higher power factor that not only is smaller the phase difference between an input voltage and an input current, but both of them have similar waveforms. This means that a higher power supply gain causes the waveform of an input current to be liable to deviate from the similar waveform.

Namely, in an improved power factor switching power supply system, a ripple with a frequency two times that of an AC voltage as an input is superimposed on the output voltage Vo (with respect to the superimposition of the ripple on the output voltage, an explanation will be made later). The magnitude of the ripple is determined by the frequency of an AC voltage as an input, the output voltage Vo, a load current and the capacitance of the output capacitor C2 without being dependent on whether the input voltage is that of a 100V system or that of a 200V system.

The ripple of the output voltage Vo also has influence on the error current signal Ierr outputted from the error amplifier 102 and further on the error signal Vcomp, into which the error current signal Ierr is converted through the phase compensating circuit 103, so that the ripple is superimposed also on the error signal Vcomp (as was explained in the foregoing, to have ripple is regardless of whether the input voltage is that of a 100V system or that of a 200V system).

While, as was explained in the foregoing, as the input voltage Vi becomes higher, an input current becomes more liable to change. Thus, with the ripple on the same error signal Vcomp, the influence of the ripple becomes larger as the input voltage Vi becomes higher. Namely, in a power supply system of a 200V system, the deviation of the waveform of an input current from an ideal waveform becomes larger than in a power supply system of a 100V system to cause degradation in the power factor.

Moreover, production of a ripple on the output voltage Vo will be explained. In an improved power factor switching power supply system, an AC input voltage is subjected to full-wave rectification so as to make an input current have a waveform of similar figure to the waveform of the full-wave rectified AC input voltage. Since the product of an input voltage and an input current is input power, the input power becomes higher as the input voltage is higher with the frequency (frequency of a full-wave form) thereof becomes two times the frequency of the AC input voltage or the AC input current.

While, since output power is the power consumed in a load, the output power can be therefore considered as being approximately constant. Compared with this, the power supplied from the switching power supply is equal to the input power with the efficiency of the power supply being neglected and changes with a frequency two times that of the AC input power.

Consequently, when the supplied power is larger than the power consumed in the load, the output capacitor C2 is charged with the excessive energy to increase the output voltage Vo. Conversely, when the supplied power is smaller than the power consumed in the load, the deficient energy is taken out from the output capacitor C2 to lower the output voltage Vo. The repetition of such operations causes ripples to be produced in the output voltage Vo.

Here, the related switching power supply system has the configuration in which when an input voltage is high, although a power supply gain also becomes high, the gain of the error amplifier 102 is simply made further increased promptly with the input voltage being high. This was a problem of causing possible oscillation in the output voltage. Moreover, there was also a problem with respect to the undershoot of the output voltage when the input voltage is low in that there was difficulty in establishing an adequate value of a phase compensation constant.

As was explained in the foregoing, the higher the input voltage becomes, the higher a power supply gain becomes to lower the power factor and the lower the input voltage becomes, the lower the power supply gain becomes to cause the transient response to become slow. Hence, for actualizing both a power factor improvement and a reduction in the delay in transient response, adaptive control in accordance with the magnitude of the input voltage is required. In the related system, however, no adaptive control based on the input voltage has been carried out.

The present invention was made in view of such points with an object of providing a control circuit of a power supply system actualizing both a power factor improvement and a reduction in the delay in transient response.

Figure 4:
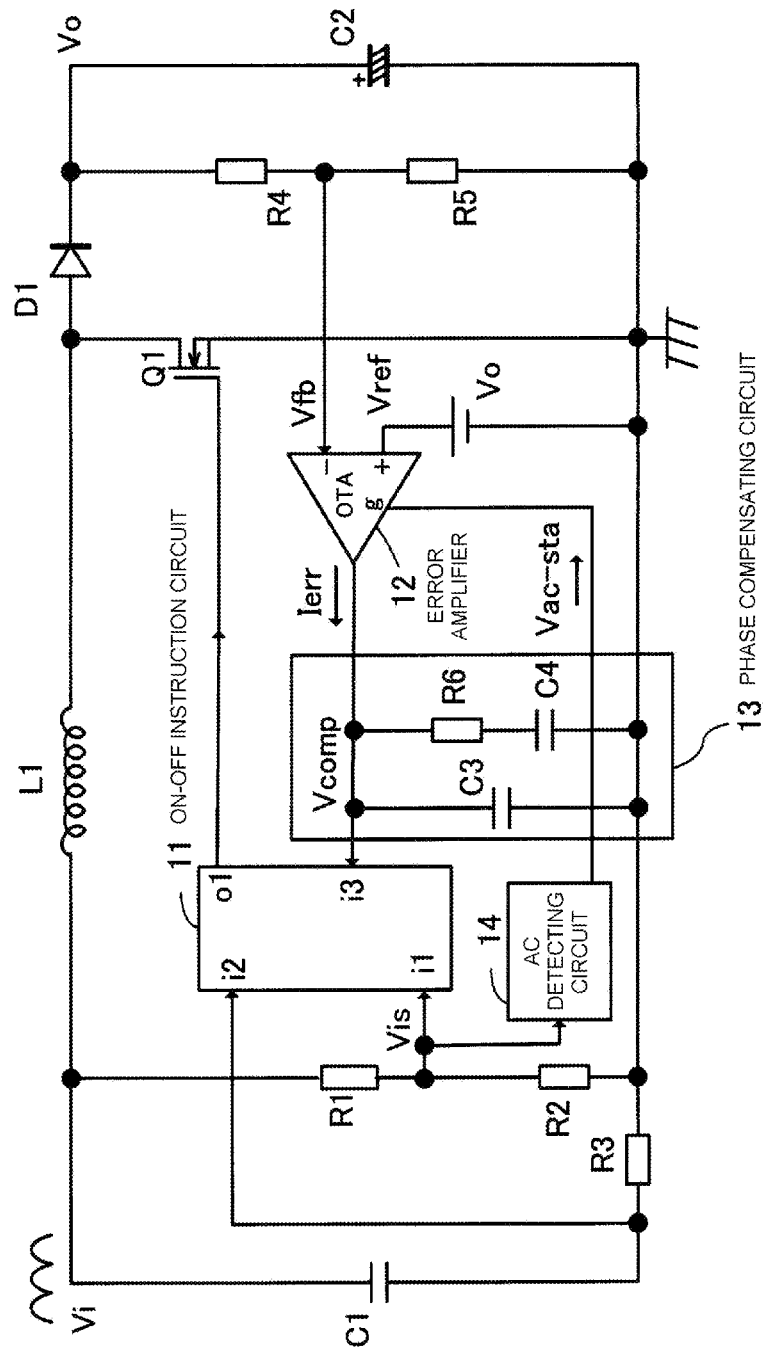
FIG. 4 is a circuit diagram showing an example of the circuit configuration of a switching power supply system according to an embodiment of the invention.

In the next, explanations will be made in detail with respect to the control circuit of a power supply system 1 in an embodiment of the invention. FIG. 4 is a circuit diagram showing an example of a circuit configuration of a switching power supply system for explaining an embodiment of the invention.

The step-up improved power factor switching power supply system 1-1 is provided with an input capacitor C1, a step-up inductor L1, a switching device (N-channel MOSFET) Q1, a rectifying diode D1, an output capacitor C2, input voltage detecting resistors R1 and R2, an operating current detecting resistor R3, an on-off instruction circuit 11, output voltage detecting resistors R4 and R5, a reference power supply unit Vo, an error amplifier (OTA) 12 as a voltage to current converting amplifier circuit, a phase compensating circuit 13 and an AC detecting circuit 14. The phase compensating circuit 13 includes capacitors C3 and C4 and a resistor R6.

The error signal producing unit 1a in FIG. 1, the phase compensating unit 1b in FIG. 1 and the input voltage detecting unit 1c in FIG. 1 correspond to the error amplifier 12, the phase compensating circuit 13 and the AC detecting circuit 14, respectively. Moreover, in the circuit of the switching power supply system 1-1 shown in FIG. 4, the input voltage detecting resistors R1 and R2, the operating current detecting resistor R3, the on-off instruction circuit 11, the output voltage detecting resistors R4 and R5, the reference power supply unit Vr, the error amplifier (OTA) 12, the phase compensating circuit 13 and the AC detecting circuit 14 forms (a part of) a control circuit of the switching power supply system 1-1. Further, at least a part of them can be integrated in a semiconductor integrated circuit.

Here, explanations will be made with respect to connections of constituents. One end of the input capacitor C1 is connected to one end of the resistor R1 and one end of the inductor L1. To the one end of the input capacitor C1, an input voltage Vi is applied. The other end of the input capacitor C1 is connected to the input terminal i2 of the on-off instruction circuit 11 and one end of the resistor R3.

The other end of the resistor R1 is connected to one end of the resistor R2, the input terminal i1 of the on-off instruction circuit 11 and the input terminal of the AC detecting circuit 14. The output terminal of the AC detecting circuit 14 is connected to the gain control terminal g of the error amplifier 12.

The other end of the inductor L1 is connected to the drain of the switching device Q1 and the anode of the diode D1. The gate of the switching device Q1 is connected to the output terminal o1 of the on-off instruction circuit 11.

The cathode of the rectifying diode D1 is connected to one end of the resistor R4 and the positive polarity side terminal of the capacitor C2. The other end of the resistor R4 is connected to one end of the resistor R5 and the inverting input terminal (−) of the error amplifier 12. The non-inverting input terminal (+) of the error amplifier 102 is connected to one end of the reference power supply unit Vo.

The output terminal of the error amplifier 12 is connected to one end of the resistor R6, one end of the capacitor C3 and the input terminal i3 of the on-off instruction circuit 11. The other end of the resistor R6 is connected to one end of the capacitor C4.

The other end of the capacitor C3 is connected to the other end of the resistor R2, the other end of the resistor R3, the other end of the capacitor C4, the other end (GND) of the reference power supply unit Vr, the source of the switching device Q1, a ground GND, the other end of the resistor R5 and the negative polarity side terminal of the capacitor C2.

In the next, the operation of the circuit will be explained. An input voltage Vi obtained by the full-wave rectification of an AC input voltage on the rectifier (not shown) side is divided by the input voltage detecting resistors R1 and R2. A voltage signal Vis obtained by the voltage division is transmitted to the input terminal 11 of the on-off instruction circuit 101.

The on-off instruction circuit 11 outputs an H (high) level signal from the output terminal o1 to turn-on the switching device Q1 with a decision that the current flowing in the inductor L1 has become zero which decision is made by an inductor current detecting signal (a voltage signal into which an inductor current flowing in the resistor R3 is converted by the resistor R3) inputted to the input terminal i2, or with triggering by an internal oscillation circuit. The turning-on of the switching device Q1 makes a current flow through the step-up inductor L1. At this time, energy is stored in the step-up inductor L1.

An output voltage Vo is divided by the output voltage detecting resistors R4 and R5 and a divided voltage (FB (feedback) voltage) Vfb is inputted to the error amplifier 12 having a V/I (voltage to current) converting function. The error amplifier 12 compares the FB voltage Vfb with a reference power supply voltage Vref to output an error current signal Ierr on the basis of the result of the comparison. The current signal Ierr is any one of current signals for two cases, the case of being the error current signal of the source current for the phase compensating circuit 13 and the case of being the error current signal of the sink current for the phase compensating circuit 13.

The phase compensating circuit 13 carries out phase compensation with the frequency characteristics of the error amplifier 12 taken into consideration to thereby produce an error signal in cooperation with the error amplifier 12. Namely, by the phase compensating circuit 13 including the capacitors C3 and C4 and the resistor R6, the current signal Ierr outputted from the error amplifier 12 is converted to an error signal Vcomp as a voltage signal (the current signal Ierr is separated to flow in the series circuit of the resistor R6 and the capacitor C4 and flow in the capacitor C3 and the separated currents generate a voltage across the resistor R6 and the capacitor C4 and a voltage across the capacitor C3). The error signal Vcomp is transmitted to the input terminal i3 of the on-off instruction circuit 11. The on-off instruction circuit 11 carries out a multiplication of the error signal Vcomp and the voltage signal Vis as the voltage at the connection point of the resistors R1 and R2. The value of the result of the multiplication is taken as the target value of an inductor current detecting signal of the switching device Q1.

The on-off instruction circuit 11, when the value of the inductor current detecting signal reaches the target value, outputs an L (low) level signal to turn-off the switching device Q01. The turning-off of the switching device Q1 makes a voltage due to the energy stored in the step-up inductor L1 added to the input voltage Vi to be outputted to the outside through the rectifying diode D1 and the output capacitor C2.

At this time, the completion of the release of the energy stored in the step-up inductor L1 or the triggering by the oscillation circuit in the on-off instruction circuit 11 turns-on the switching device Q1 again. By repeating such operations, a power factor is improved while a specified output voltage being obtained.

In the next, the gain changing control of the error amplifier 12 will be explained. The AC detecting circuit 14 detects the voltage signal Vis as a divided voltage signal of the input voltage Vi. According to the value of the detected voltage signal Vis, the gain of the error amplifier 12 is changed.

When the voltage signal Vis is always lower than the threshold voltage established beforehand during a half period of the AC input voltage (when the input voltage Vi is that of a 100 Vac system, for example), for making the transient response of the phase compensating circuit 13 faster, the AC detecting circuit 14 enhances the gain of the error amplifier 12. In this case, the AC detecting circuit 14 transmits a control signal Vac-sta at an L (Low) level, for example, to the gain control terminal g of the error amplifier 12 to establish the gain of the error amplifier 12 high.

While, when the voltage signal Vis is sometimes higher than the threshold voltage established beforehand during a half period of the AC input voltage (when the input voltage Vi is that of a 200 Vac system, for example), for enhancing the power factor, the AC detecting circuit 14 lowers the gain of the error amplifier 12. In this case, the AC detecting circuit 14 transmits a control signal Vac-sta at an H (High) level, for example, to the gain control terminal g of the error amplifier 12 to establish the gain of the error amplifier 12 low. Whether the voltage signal Vis is always lower or sometimes higher than the threshold voltage established beforehand during a half period of the AC input voltage can be decided also by comparing the voltage (close to) the peak value of the voltage signal Vis with the threshold voltage.

Figure 5:
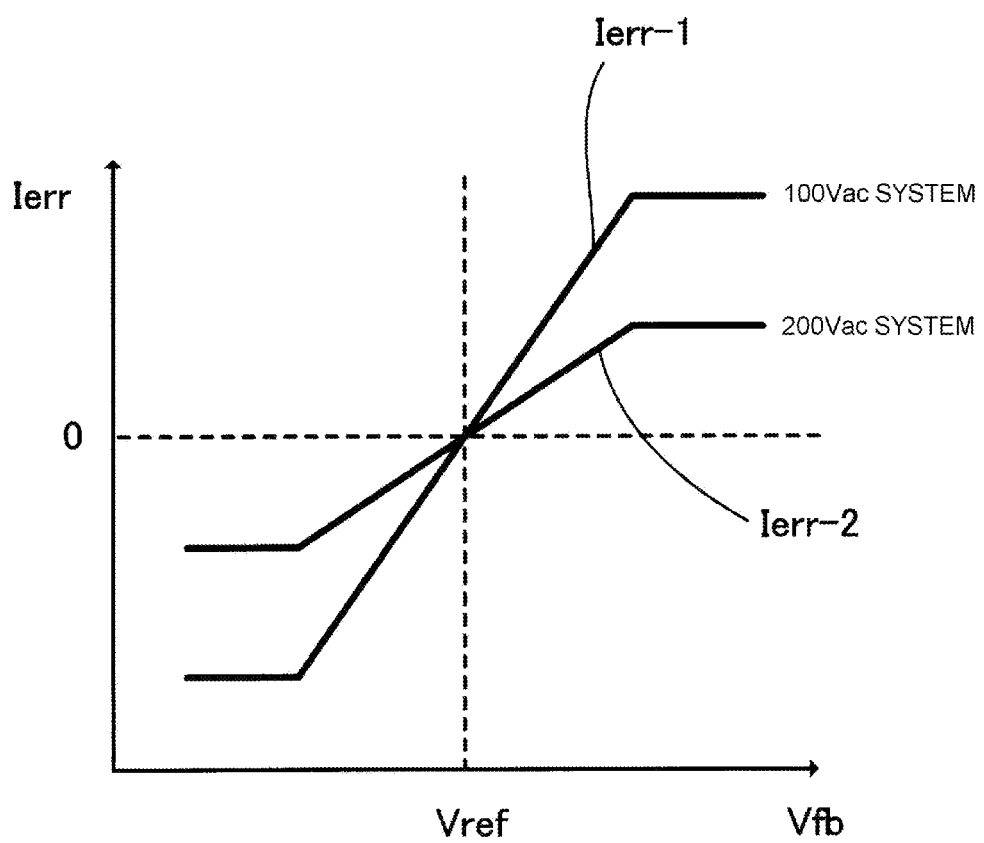
FIG. 5 is a diagram showing the relation between the FB voltage and the output current of the error amplifier in the switching power supply system according to the embodiment of the invention.

FIG. 5 is a diagram showing the relation between the FB voltage Vfb and the error current signal Ierr as the output current of the error amplifier 12 in the embodiment of the invention. The horizontal axis represents the FB voltage Vfb and the vertical axis represents the error current signal Ierr in the error amplifier 12. An error current signal Ierr-1 is the output current of the error amplifier 12 in the case in which the input voltage Vi is that of a 100 Vac system, for example. An error current signal Ierr-2 is the output current of the error amplifier 12 in the case in which the input voltage Vi is that of a 200 Vac system, for example.

When the input voltage Vi is that of the 100 Vac system, the AC detecting circuit 14 establishes the gain of the error amplifier 12 high for making the transient response of the phase compensating circuit 13 fast. Hence, the error current signal Ierr-1 outputted from the error amplifier 12 is larger than the error current signal Ierr-2.

When the input voltage Vi is that of the 200 Vac system, the AC detecting circuit 14 establishes the gain of the error amplifier 12 low for enhancing the power factor. Hence, the error current signal Ierr-2 outputted from the error amplifier 12 becomes smaller than the error current signal Ierr-1.

As was described in the foregoing, an input voltage is detected by the AC detecting circuit 14, which outputs the control signal Vac-sta for changing a gain between that corresponding to the 100 Vac system and that corresponding to the 200 Vac system. By the control signal Vac-sta, the AC detecting circuit 14 adaptively changes the gain of the error amplifier 12 according to the magnitude of the input voltage.

This makes the gain of the error amplifier 12 established high when an input voltage is low (an input voltage of the 100 Vac system, for example) to allow the transient response of the phase compensating circuit 13 to become fast (the well-provided power factor in the 100 Vac system also brings about a fast transient response in the 100 Vac system).

Moreover, when an input voltage is high (an input voltage of the 200 Vac system, for example), the gain of the error amplifier 12 is established low to allow a power factor to become well-provided. The power supply gain established high makes no transient response become slow even though the gain of the error amplifier 12 is established low to allow no undershoot of the output voltage to become large.

Therefore, in a worldwide power supply, both an improvement in power factor and a reduction in delay can be actualized while the power supply is carrying out a stable operation. Furthermore, also to the undershoot in the 100 Vac system, the adjustable phase compensation constant value (the capacitance values of the capacitors C3 and C4 and the resistance value of the resistor R6) allows the design to become feasible.

Figure 6:
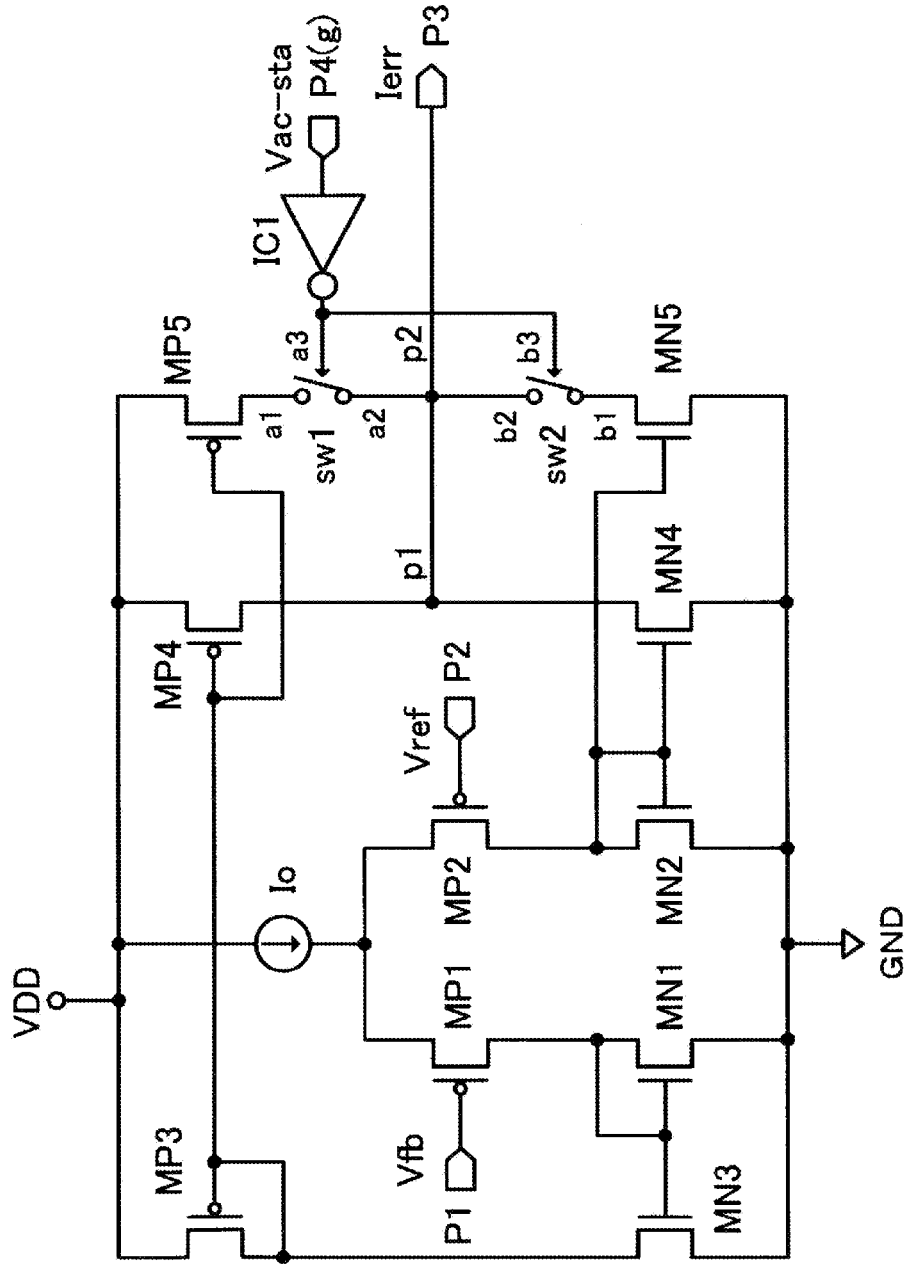
FIG. 6 is a circuit diagram showing an example of the circuit configuration of the error amplifier according to the embodiment of the invention.

Subsequent to this, the configuration of the error amplifier 12 with adjustable gain establishment will be explained. FIG. 6 is a circuit diagram showing an example of the circuit configuration of the error amplifier according to the embodiment of the invention.

The error amplifier 12 includes transistors (P-channel MOSFETs) MP1 to MP5, transistors (N-channel MOSFETs) MN 1 to MN5, switches sw1 and sw2, a constant current source to and an inverter IC1.

Furthermore, the error amplifier 12 is provided with terminals P1 to P4 as input and output signal terminals. The terminal P1 is the input terminal of the FB voltage Vfb and the terminal P2 is the input terminal of the reference voltage Vref. The terminal P3 is the output terminal of the error current signal Ierr and the terminal P4 is the input terminal of the control signal Vac-sta outputted from the AC detecting circuit 14. Thus, the terminal P4 is the same as the gain control terminal g shown in FIG. 4.

Here, explanations will be made with respect to connections of constituents. A power supply with a power supply voltage VDD is connected to the sources of the transistors MP3, MP4 and MP5 and to the constant current source Io. The gate of the transistor MP3 is connected to the gates of the transistors MP4 and MP5, the drain of the transistor MP3 and the drain of the transistors MN3.

The output end of the constant current source to is connected to the sources of the transistors MP1 and MP2. To the gate of the transistor MP1, the terminal P1 is connected and to the gate of the transistor MP2, the terminal P2 is connected.

The drain of the transistor MP1 is connected to the drain of the transistor MN1 and the gates of the transistors MN1 and MN3. The drain of the transistor MP2 is connected to the drain of the transistor MN2 and the gates of the transistors MN2, MN4 and MN5.

The source of the transistor MN3 is connected to the sources of the transistors MN1, MN2, MN4 and MN5 and to a ground GND. The drain of the transistor MP4 is connected to the drain of the transistor MN4, the terminal a2 of the switch sw1, the terminal b2 of the switch sw2 and the terminal P3. The terminal P4 is connected to the input terminal of the inverter IC1 and the output terminal of the inverter IC1 is connected to the terminal a3 of the switch sw1 and the terminal b3 of the switch sw2. The drain of the transistor MP5 is connected to the terminal a1 of the switch sw1 and the drain of the transistor MN5 is connected to the terminal b1 of the switch sw2.

The operation of the error amplifier 12 will be explained. The circuit of the error amplifier 12 is a circuit which converts a voltage difference between the FB voltage Vfb inputted to the terminal P1 and the reference voltage Vref inputted to the terminal P2 to the error current signal Ierr. The transistor MP1 (a first current branch) and the transistor MP2 (a second current branch) form a circuit sharing the constant current from the constant current source Io.

When the FB voltage Vfb is higher than the reference voltage Vref. i.e. Vfb and Vref are expressed as Vfb>Vref, a current larger than a current flowing in the transistor MP1 flows on the transistor MP2 side. While, when the FB voltage Vfb is lower than the reference voltage Vref, i.e. Vfb and Vref are expressed as Vfb<Vref, a current larger than a current flowing in the transistor MP2 flows on the transistor MP1 side.

Here, a current mirror circuit is formed by the transistors MN1 and MN3 and a current mirror circuit is formed by the transistors MP3, MP4 and MP5. Furthermore, a current mirror circuit is formed by the transistors MN2, MN4 and MN5.

By the current mirror circuit formed of the transistor MN1, connected in series to the transistor MP1, and of the transistor MN3 and the current mirror circuit formed of the transistor MP3, connected in series to the transistor MN3, and of the transistors MP4 and MP5, the transistor MP4 (a first transistor) and, (when the drain of the transistor MP5 is not opened), the transistor MP5 (a second transistor) have a first current and second current, respectively, flow therein the values of which currents are proportional to the value of the current flowing in the transistor MP1.

Moreover, by the current mirror circuit formed of the transistor MN2, connected in series to the transistor MP2, and of the transistors MN4 and MN5, the transistor MN4 (a third transistor) and, (when the drain of the transistor MN5 is not opened), the transistor MN5 (a fourth transistor) have a third current and fourth current, respectively, flow therein the values of which currents are proportional to the value of the current flowing in the transistor MP2.

Here, when the control signal Vac-sta is a signal at a level indicating that the input voltage is high (H level, for example), the switches sw1 and sw2 (corresponding to an output control unit) are made to be turned-off (disconnected) which connect the transistors MP5 and MN5, respectively, to the terminal P3.

At this time, at a connection point p1 (first connection point) to which the drain of the transistor MP4 and the drain of the transistor MN4 are connected, a current signal (first current signal) flows which is the difference between the current (first current) flowing out from the transistor MP4 and the current (third current) flowing into the transistor MN4. Letting the first current signal be a current signal A1, the turned-off switches sw1 and sw2 allows the current signal A1 to be outputted from the terminal P3 as the error current signal Ierr.

While, when the control signal Vac-sta is a signal at a level indicating that the input voltage is low (L level, for example), the switches sw1 and sw2 are made to be turned-on (brought into conduction) which connect the transistors MP5 and MN5, respectively, to the terminal P3.

At this time, from a connection point p2 (second connection point) to which the drain of the transistor MP5 and the drain of the transistor MN5 are connected, a current signal (second current signal) flows to the terminal P3 which current signal is the difference between the current (second current) flowing out from the transistor MP5 and the current (fourth current) flowing into the transistor MN5. Letting the second current signal be a current signal A2, a current signal having the current signal A2 added to the current signal A1 is to be outputted from the terminal P3 as the error current signal Ierr. That is, the gain of the error amplifier 12 becomes to increase.

Figure 7:
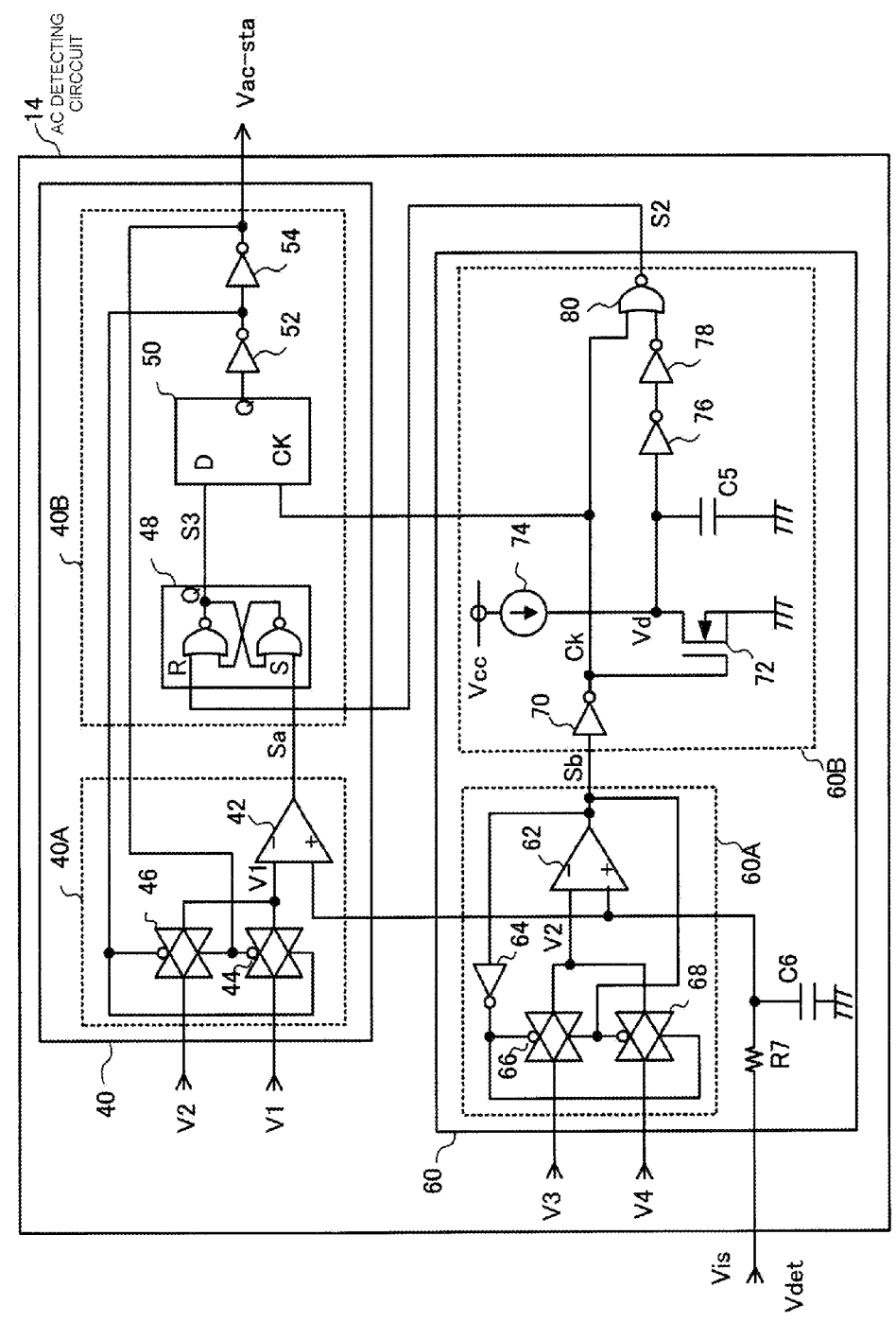
FIG. 7 is a circuit diagram showing an example of the circuit configuration of the AC detecting circuit according to the embodiment of the invention.

In the next, the configuration of the AC detecting circuit 14 will be explained. FIG. 7 is a circuit diagram showing an example of the circuit configuration of the AC detecting circuit according to the embodiment of the invention. The AC detecting circuit 14 includes a selecting signal holding unit 40 and a timing detecting circuit 60 instructing a switching timing of the control signal Vac-sta to the selecting signal holding unit 40.

The selecting signal holding unit 40 is formed of a comparator 42, transfer gates 44 and 46, an RS flip-flop 48, a D flip-flop 50 and inverters 52 and 54 and holds and outputs the control signal Vac-sta corresponding to the result of the monitoring of the AC input voltage.

To the selecting signal holding unit 40, voltage signals V1 and V2 (V1>V2) are inputted the magnitudes of which are different from each other. The voltage signals V1 and V2 are supplied as a first reference voltage and a second reference voltage through the transfer gates 44 and 46, respectively, to the inverting input terminal of the comparator 42.

The non-inverting input terminal of the comparator 42 is grounded through a capacitor C6 and, along with this, is connected to a terminal Vdet through a resistor R7 to which terminal the voltage signal Vis is inputted. Here, the capacitor C6 and the resistor R7 form an input filter to the voltage signal Vis.

In this way, to the non-inverting input terminal of the comparator 42, the voltage signal Vis is supplied which has a detected value of the AC input voltage proportional to the value of the full wave rectified voltage Vi of the AC input voltage, by which the magnitude of the AC input voltage is monitored by the comparator 42 and the transfer gates 44 and 46. More specifically, a monitoring circuit 40A is thus formed which makes a decision as to whether the AC input voltage is that of the high voltage system (200 Vac system, for example) or that of the low voltage system (100 Vac system, for example) by monitoring whether the value of the voltage signal Vis is always lower or sometimes higher than the threshold value established beforehand (or whether the detected value of the voltage close to the peak value of the AC input voltage is higher or lower than the value of a reference voltage) during a half period of the AC input voltage.

From the monitoring circuit 40A, the output signal Sa of the comparator 42 is supplied to the one input terminal S of the RS flip-flop 48 as the result of the monitoring of the AC input voltage. The RS flip-flop 48 is a device in which the supply of the output signal Sa of the comparator 42 to the input terminal S as an H level signal makes an output terminal Q output a signal with the same H level. After this, even though the level of the output signal Sa of the comparator 42 supplied to the input terminal S returns to the L level, the state of the output signal from the output terminal Q is not changed to be kept at the H level.

To the other input terminal R of the RS flip-flop 48, a one-shot signal S2 is supplied from the timing detecting unit 60. The RS flip-flop 48, when the level of the signal inputted to the other input terminal R becomes H level with the level of the output signal Sa of the comparator 42 inputted to the input terminal S being the L level, inverts the level of an output signal S3 from the output terminal Q to the L level.

In the selecting signal holding unit 40, a holding circuit 40B holding a selecting signal according to the result of monitoring of the AC input voltage is formed by the RS flip-flop 48, the D flip-flop 50 and the inverters 52 and 54.

Here, the holding circuit 40B is formed so that the output terminal Q of the RS flip-flop 48 is connected to the D input terminal of the D flip-flop 50 to allow the output signal S3 of the RS flip-flop 48 to be read into the D flip-flop 50 from the D input terminal in synchronization with a clock signal Ck supplied to a CK terminal of the D flip-flop 50.

The D flip-flop 50 in the holding circuit 40B has the output terminal Q thereof connected through the inverter 52 to the first control terminal of the transfer gate 44 and the second control terminal of the transfer gate 46.

The output terminal of the inverter 52 is further connected through the inverter 54 to the second control terminal of the transfer gate 44 and the first control terminal of the transfer gate 46.

Here, each of the transfer gates 44 and 46, when a signal at the H level is inputted to the first control terminal thereof and a signal at the L level is inputted to the second control terminal thereof, becomes in a conduction state to allow an input signal to be transmitted onto the output side.

Moreover, the D flip-flop 50 has the output signal from the output terminal Q thereof outputted outside through the inverters 52 and 54 as a control signal Vac-sta.

The monitoring circuit 40A forms a hysteresis comparator controlled by the outputs of the inverter 52 and the inverter 54 which outputs are determined by the output of the D flip-flop 50 in the holding circuit 40B.

Here, the output of the D flip-flop 50 at the L level makes the outputs of the inverters 52 and 54 at the H level and the L level, respectively. This brings the transfer gate 44 into conduction to allow the first reference voltage V1 to be inputted to the inverting input terminal of the comparator 42. At this time, when the voltage signal Vis having a detected value of the AC input voltage exceeds the first reference voltage V1, the level of the output signal Sa of the comparator 42 becomes the H level to set the RS flip-flop 48.

This brings the level of the output signal S3 of the RS flip-flop 48 to the H level and the output signal S3 at the H level is read into the D flip-flop 50. Hence, the output of the D flip-flop 50 becomes the H level to make the outputs of the inverters 52 and 54 at the L level and the H level, respectively. Thus, the transfer gate 46 is brought into conduction this time to allow the second reference voltage V2 to become inputted to the inverting input terminal of the comparator 42.

While, immediately after the D flip-flop 50 carried out a reading operation with the clock signal Ck inputted to the CK terminal of the D flip-flop 50, the one-shot signal S2 is produced in the timing detecting unit 60. The one-shot signal S2 is inputted to the input terminal R of the RS flip-flop 48, by which the RS flip-flop 48 is made to be reset.

Thereafter, even though the voltage signal Vis having a detected value of the AC input voltage becomes lower than the value of the first reference voltage V1, as long as the value of the voltage signal Vis exceeds the value of the second reference voltage V2, the RS flip-flop 48 is reset again to bring the level of the output signal S3 thereof to the H level. Hence, the level of the output of the D flip-flop 50 is kept in a state of being at the H level.

While, as long as no voltage signal Vis, having a detected value of the AC input voltage, exceeds the second reference voltage V2 during the time from the reset of the RS flip-flop 48 by the clock signal Ck to the generation of the next clock signal Ck, the level of the output signal S3 of the RS flip-flop 48 is kept at the L level.

Then, the output signal S3 at the L level is read into the D flip-flop 50, which outputs a signal at the L level. As a result, the transfer gate 44 is brought into conduction again, by which the first reference voltage V1 is to be inputted to the inverting input terminal of the comparator 42.

Thereafter, even though the voltage signal Vis having a detected value of the AC input voltage exceeds the value of the second reference voltage V2, as long as no value of the voltage signal Vis exceeds the value of the first reference voltage V1, the RS flip-flop 48 is left to be reset. Hence, the level of the output of the D flip-flop 50 is kept in a state of being at the L level.

The timing detecting unit 60 is a unit formed of a comparator circuit 60A and a pulse generating circuit 60B to detect a timing at which the AC input voltage reached close to the zero level for instructing the selecting signal holding unit 40 to output the selecting signal.

The comparator circuit 60A is formed of a comparator 62, an inverter 64 and transfer gates 66 and 68. To the transfer gates 66 and 68, voltage signals V3 and V4 (V3>V4) are inputted which are supplied as the third reference voltage V3 and the fourth reference voltage V4 through the transfer gates 66 and 68, respectively, to the inverting input terminal of the comparator 62.

In the comparator circuit 60A, to the non-inverting input terminal of the comparator 62, the voltage signal Vis is supplied which has a detected value of the AC input voltage proportional to the value of the full wave rectified voltage Vi of the AC input voltage. From the comparator 62, an output signal Sb is outputted to the pulse generating circuit 60B as a result of monitoring the AC input voltage.

The pulse generating circuit 60B, on the basis of the output signal Sb of the comparator circuit 60A, raises the clock signal Ck at a timing at which the voltage signal Vis having a detected value of the AC input voltage lowers to reach the third reference voltage V3.

At this time, the third reference voltage V3 supplied to the comparator circuit 60A is established as being smaller than the first reference voltage V1 and the second reference voltage V2 (V1>V2>V3). With the third reference voltage V3 taken as a reference, the AC input voltage is monitored to determine the timing at which the AC input voltage reaches close to the zero level.

In the comparator circuit 60A, the output terminal of the comparator 62 is directly connected to the first control terminal of the transfer gate 66 and the second control terminal of the transfer gate 68. The output terminal of the comparator 62 is further connected to the second control terminal of the transfer gate 66 and the first control terminal of the transfer gate 68 through the inverter 64.

The fourth reference voltage V4 is established as being smaller than the first reference voltage V1 and the second reference voltage V2 and larger than the third reference voltage V3 (V1>V2>V4>V3). This provides hysteresis to the comparator 62.

Namely, the output signal Sb of the comparator 62 being at the H level brings the transfer gate 66 into conduction, by which the third reference voltage V3 is inputted to the inverting input terminal of the comparator 62. While, the output signal Sb of the comparator 62 being at the L level brings the transfer gate 68 into conduction, by which the fourth reference voltage V4 is inputted to the inverting input terminal of the comparator 62.

With the configuration, when the voltage signal Vis having a detected value of the full wave rectified AC input voltage decreases to reach close to the zero level and become less than the third reference voltage V3, the level of the output signal Sb of the comparator 62 is inverted from the H level to the L level.

Then, when the voltage signal Vis having a detected value of the full wave rectified AC input voltage terminates the decrease thereof to change into an increase and the value thereof exceeds the value of the fourth reference voltage V4, the level of the output signal Sb of the comparator 62 is inverted from the L level to the H level.

Namely, in the comparator circuit 60A, when the level of the voltage signal Vis having a detected value of the full wave rectified AC input voltage becomes close to the zero level, the output signal Sb of a short pulse at the L level is outputted from the comparator 62.

Moreover, the pulse generating circuit 60B is formed of an inverter 70, an N-channel MOSFET 72, a constant current source 74, a capacitor C5, inverters 76 and 78 and a NOR gate 80.

Here, the output signal Sb of the comparator circuit 60A is inverted by the inverter 70 to produce the clock signal Ck. The clock signal Ck is supplied to the gate terminal of the N-channel MOSFET 72, one input terminal of the NOR gate 80 and the CK terminal of the D flip-flop 50 in the selecting signal holding unit 40.

The N-channel MOSFET 72 and the constant current source 74 are connected in series between a power supply Vcc and the ground. The connection point of the drain terminal of the MOSFET 72 and the constant current source 74 is connected to the input terminal of the inverters 76.

Moreover, the connection point of the drain terminal of the MOSFET 72 and the constant current source 74 is grounded through the capacitor C5. The constant current source 74 and the capacitor C5 form an integrating circuit which is operated to transmit the dock signal Ck with the falling of the dock signal Ck made delayed.

Namely, the falling of the dock signal Ck turns-off (cuts off) the MOSFET 72 to start the integral of the constant current of the constant current source 74 by the capacitor C5. Then, when the integrated voltage of the capacitor C5 (the voltage across the capacitor C5) reaches the threshold voltage of the inverter 76, the level of the output of the inverter 76 is inverted from the H level to the L level. Only after this time, the falling of the clock signal Ck is transmitted to the inverter 78.

The rising of the clock signal Ck turns-on (conducts) the MOSFET 72 to immediately discharge the capacitor C5 to bring the levels of the outputs of the inverters 76 and 78 into the H level and the L level, respectively. The output signal of the inverter 78 is inputted to the other input terminal of the NOR gate 80.

In this way, in the NOR gate 80, a non-disjunction operation (NOR operation) is carried out with the clock signal Ck and a voltage Vd at the drain terminal of the MOSFET 72. From this, when the level of the clock signal Ck is the H level, one of the input signals to the NOR gate 80 (the clock signal Ck) is to be at the H level. Therefore, the level of the output of the NOR gate 80 becomes always the L level.

While, when the level of the clock signal Ck falls from the H level to the L level, immediately after this, the integrated voltage of the capacitor C5, started to be charged by the constant current source 74 with the MOSFET 72 made turned-off, does not reach the threshold voltage of the inverter 76 yet. Thus, both of the two input signals to the NOR gate 80 are at the L level, by which the level of the output of the NOR gate 80 becomes the H level.

After this, the integrated voltage of the capacitor C5, having reached the threshold voltage of the inverter 76, brings the level of the output of the inverter 78 to the H level, by which the level of the output of the NOR gate 80 becomes the L level. Therefore, from the NOR gate 80, the one-shot signal S2 at the H level is produced which has a time width determined by the current value of the constant current source 74, the capacitance of the capacitor C5 and the threshold voltage of the inverter 76. The produced one-shot signal S2 is outputted in synchronization with the falling of the clock signal Ck.

As was explained in the foregoing, the level of the voltage signal Vis having a detected value of the AC input voltage becoming close to the zero level makes the output signal Sb of a short pulse at the L level outputted from the comparator 62. Hence, at this time, the clock signal Ck becomes a short pulse signal at the H level to which the output signal Sb is inverted.

The D flip-flop 50 in the holding circuit 40B carries out a reading operation at the rising of the clock signal Ck. While, the RS flip-flop 48 is reset by the one-shot signal S2 in synchronization with the falling of the clock signal Ck.

Then, the holding circuit 40B, when the level of the voltage signal Vis having a detected value of the AC input voltage becomes close to the zero level with the half period of the AC input voltage coming to the end, first memorizes the state of the RS flip-flop 48 in the D flip-flop 50 and, immediately thereafter, resets the RS flip-flop 48 to prepare for the input from the monitoring circuit 40A in the next half period.

As was explained in the foregoing, according to the control circuit of the power supply system 1 of the embodiment of the invention, to the error amplifier in the control circuit, a circuit configuration is provided which increases the gain of the error amplifier when an input side detected voltage is lower than a threshold voltage and decreases the gain of the error amplifier when an input side detected voltage is higher than the threshold voltage.

With this, by carrying out adaptive control of a gain adjustment in accordance with the magnitude of the input voltage to the error amplifier, it becomes possible to actualize both a power factor improvement and a reduction in the delay in transient response in the phase compensation circuit in the control circuit.

In the foregoing, there was shown an example of an embodiment of the invention. The configuration of the units and circuits shown in the embodiment can be substituted by other ones having similar functions. Moreover, other arbitrary constituents and/or operation steps can be additionally provided.

For example, in the embodiment, the case was shown where the invention is applied to a so-called current mode power supply in which the switching device Q1 is turned-off when the value of the inductor current detecting signal reaches the target value. The invention, however, can be also applied in the same way to a so-called voltage mode power supply (like in a current mode power supply, it is necessary only that the gain in an error amplifier is changed) in which an oscillation circuit is provided in the control circuit to determine the turning-on and -off of the switching device from the result of a comparison between a carrier signal outputted from the oscillation circuit and the error signal Vcomp. The carrier signal is a signal of such as a triangular wave, a sawtooth wave or a trapezoidal wave, for example, with the minimum value, the maximum value and the frequency thereof being constant.

While the present invention has been particularly shown and described with reference to the preferred embodiment thereof, it will be understood by those skilled in the art that the foregoing and other changes in form and details can be made therein without departing from the spirit and scope of the present invention.

Examples of specific embodiments are illustrated in the accompanying drawings. While the invention is described in conjunction with these specific embodiments. It will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-105884, filed on May 7, 2012. The disclosure of the priority application, in its entirety, including the drawings, claims, and the specification thereof, is incorporated herein by reference.

What is claimed is:

1. A control circuit of a power supply system converting a rectified AC input voltage to a DC output voltage comprising:
   an error signal producing unit detecting the DC output voltage and outputting a signal into which the difference voltage between the detected DC output voltage and a reference voltage is amplified;
   a phase compensating unit producing an error signal in cooperation with the error signal producing unit; and
   an input voltage detecting unit detecting the rectified AC input voltage and outputting a control signal with the level thereof based on a comparison between a magnitude of the detected rectified AC input voltage and a predetermined threshold voltage, to change the gain in the error signal producing unit by the outputted control signal.

2. The control circuit of a power supply system as claimed in claim 1 wherein the input voltage detecting unit increases the gain of the error signal producing unit when deciding that the rectified AC input voltage is the voltage of a low voltage system and decreases the gain of the error signal producing unit when deciding that the rectified AC input voltage is the voltage of a high voltage system.

3. The control circuit of a power supply system as claimed in claim 1 wherein when the detected rectified AC input voltage is lower than a threshold voltage during a half period of the rectified AC input voltage, the input voltage detecting unit decides that the rectified AC input voltage is the voltage of a low voltage system, and when the detected rectified AC input voltage is sometimes higher than the threshold voltage during a half period of the rectified AC input voltage, the input voltage detecting unit decides that the rectified AC input voltage is the voltage of a high voltage system.

4. The control circuit of a power supply system as claimed in claim 1 wherein the error signal producing unit is a voltage to current converting amplifier circuit.

5. The control circuit of a power supply system as claimed in claim 1 wherein a multiplication of the error signal and the detected rectified AC input voltage is carried out and, on the basis of the result of the multiplication, on-off control of a switching device combining the rectified AC input voltage and the DC output voltage is carried out.

6. The control circuit of a power supply system as claimed in claim 1 wherein a comparison is carried out between the error signal and a carrier signal outputted from an oscillation circuit and, on the basis of the result of the comparison, on-off control of a switching device combining the rectified AC input voltage and the DC output voltage is carried out.

7. A control circuit of a power supply system converting a rectified AC input voltage to a DC output voltage comprising:
   an error signal producing unit detecting the DC output voltage and outputting a signal into which the difference voltage between the detected DC output voltage and a reference voltage is amplified;
   a phase compensating unit producing an error signal in cooperation with the error signal producing unit; and
   an input voltage detecting unit detecting the rectified AC input voltage and outputting a control signal with the level thereof corresponding to the magnitude of the detected rectified AC input voltage to change the gain in the error signal producing unit by the outputted control signal; wherein the error signal producing unit comprises:
   a constant current source;
   a first and second current branches sharing a constant current from the constant current source according to the magnitude of the detected DC output voltage and the magnitude of the reference voltage;
   a first transistor of a P-channel type in which a first current flows between the drain and the source thereof with an amount proportional to the amount of a current flowing in the first current branch;
   a second transistor of a P-channel type in which a second current flows between the drain and the source thereof with an amount proportional to the amount of the current flowing in the first current branch;
   a third transistor of an N-channel type in which a third current flows between the drain and the source thereof with an amount proportional to the amount of a current flowing in the second current branch;
   a fourth transistor of an N-channel type in which a fourth current flows between the drain and the source thereof with an amount proportional to the amount of the current flowing in the second current branch; and
   an output control unit producing the error signal from a first current signal flowing through a first connection point and a second current signal flowing through a second connection point on the basis of the level of a control signal for gain changing outputted from the input voltage detecting unit, and outputting the produced error signal, the first connection point being the connection point of the drain of the first transistor and the drain of the third transistor and the second connection point being the connection point of the drain of the second transistor and the drain of the fourth transistor,
   when the detected DC output voltage is higher than the reference voltage, makes a current larger than a current flowing in the first current branch flow on the second current branch side, and
   when the detected DC output voltage is lower than the reference voltage, makes a current larger than a current flowing in the second current branch flow on the first current branch side, and
   the output control unit, when recognizing from the level of the control signal that the detected rectified AC input voltage is higher than the threshold voltage, outputs the first current signal, being the difference obtained by subtracting the third current flowing in the third transistor from the first current flowing in the first transistor, as the error signal, and when recognizing that the detected rectified AC input voltage is lower than the threshold voltage, outputting a current signal, being the sum obtained by adding the second current signal, being the difference obtained by subtracting the fourth current flowing in the fourth transistor from the second current flowing in the second transistor, to the first current signal, as the error signal.

\* \* \* \* \*